(12) United States Patent
Guglielmin

(10) Patent No.: US 11,859,506 B2
(45) Date of Patent: Jan. 2, 2024

(54) MOUNTING STRUCTURE FOR A GAS TURBINE ENGINE CASE

(71) Applicant: Pratt & Whitney Canada Corp., Longueuil (CA)

(72) Inventor: Nicholas Guglielmin, Toronto (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 17/746,514

(22) Filed: May 17, 2022

(65) Prior Publication Data
US 2023/0374913 A1  Nov. 23, 2023

(51) Int. Cl.
F01D 25/24  (2006.01)
B64D 27/26  (2006.01)

(52) U.S. Cl.
CPC .......... F01D 25/243 (2013.01); B64D 27/26 (2013.01)

(58) Field of Classification Search
CPC .............................. F01D 25/243; B64D 27/26
USPC ...................................................... 415/213.1
See application file for complete search history.

(56) References Cited

U.S. PATENT DOCUMENTS

| | | | |
|---|---|---|---|
| 5,605,438 A | 2/1997 | Burdgick | |
| 9,316,108 B2 | 4/2016 | Pegan, Jr. | |
| 9,328,629 B2 | 5/2016 | Scott | |
| 10,329,956 B2 | 6/2019 | Scott | |
| 10,821,583 B2 | 11/2020 | Pergantis | |
| 2009/0184197 A1* | 7/2009 | Cloft | B64D 27/26 244/54 |
| 2012/0177490 A1 | 7/2012 | Lussier | |
| 2014/0369810 A1 | 12/2014 | Binks | |
| 2015/0047370 A1 | 2/2015 | Beaujard | |
| 2015/0315977 A1 | 11/2015 | Suciu | |
| 2016/0201490 A1* | 7/2016 | Scott | F01D 9/065 415/213.1 |
| 2017/0362960 A1 | 12/2017 | Treat | |
| 2022/0194609 A1* | 6/2022 | Gormley | B64D 27/26 |

OTHER PUBLICATIONS

EP Search Report for EP Patent Application No. 23174052.3 dated Sep. 21, 2023.

* cited by examiner

Primary Examiner — Yi-Kai Wang
(74) Attorney, Agent, or Firm — Getz Balich LLC

(57) ABSTRACT

A structure is provided for a gas turbine engine. This gas turbine engine structure includes an engine case, an engine pylon and an engine line. The engine case includes a base, a mounting boss and a first support element. The base extends axially along and circumferentially about an axial centerline of the engine case. The mounting boss projects radially out from the base. The first support element projects radially out from the base and laterally out from the mounting boss. The first support element is configured as or otherwise includes a peripheral boss. The engine pylon is mounted to the mounting boss. The engine line is coupled to the peripheral boss.

20 Claims, 7 Drawing Sheets

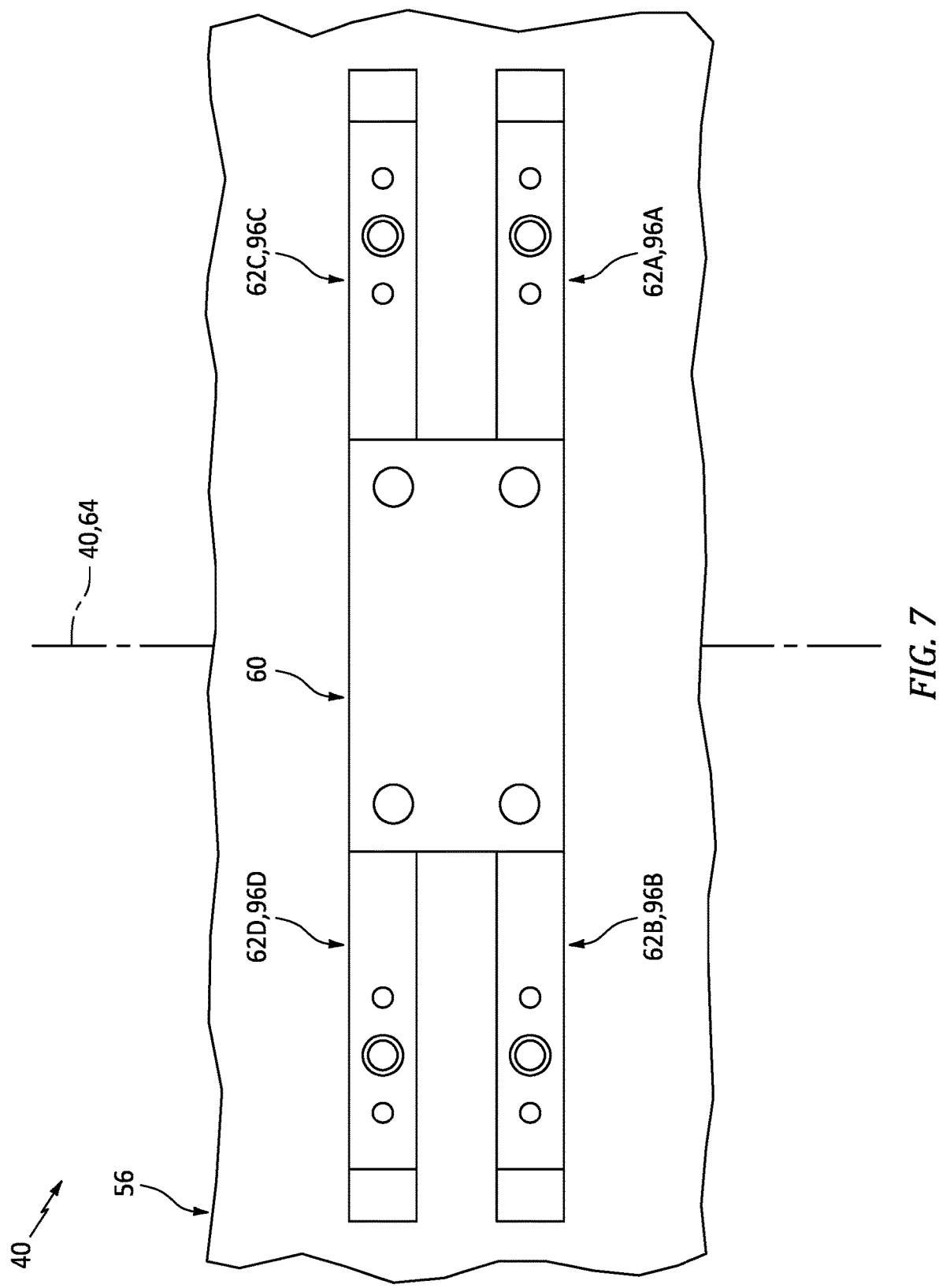

MOUNTING STRUCTURE FOR A GAS TURBINE ENGINE CASE

TECHNICAL FIELD

This disclosure relates generally to a gas turbine engine and, more particularly, to a case for the gas turbine engine.

BACKGROUND INFORMATION

A gas turbine engine may be mounted to a wing or a fuselage of an aircraft by a pylon. This pylon may be connected to a case of the gas turbine engine through a mounting boss. Various types and configurations of mounting bosses are known in the art. While these known mounting bosses have various benefits, there is still room in the art for improvement. There is a need in the art therefore for an improved mounting boss structure for mounting an engine pylon to a gas turbine engine case.

SUMMARY

According to an aspect of the present disclosure, a structure is provided for a gas turbine engine. This gas turbine engine structure includes an engine case, an engine pylon and an engine line. The engine case includes a base, a mounting boss and a first support element. The base extends axially along and circumferentially about an axial centerline of the engine case. The mounting boss projects radially out from the base. The first support element projects radially out from the base and laterally out from the mounting boss. The first support element is configured as or otherwise includes a peripheral boss. The engine pylon is mounted to the mounting boss. The engine line is coupled to the peripheral boss.

According to another aspect of the present disclosure, another structure is provided for a gas turbine engine. This gas turbine engine structure includes an engine case. The engine case includes a base, a mounting boss and a peripheral boss formed integral with the mounting boss and the base. The base extends axially along and circumferentially about an axial centerline of the engine case. The mounting boss projects radially out from the base to a mounting boss outer surface. The peripheral boss projects radially out from the base to a peripheral boss outer surface. The peripheral boss outer surface is angularly offset from and contiguous with the mounting boss outer surface.

According to still another aspect of the present disclosure, another structure is provided for a gas turbine engine. This gas turbine engine structure includes an engine case. The engine case includes a base, a mounting boss, a first support element and a second support element axially spaced from the first support element by a gap. The base extends axially along and circumferentially about an axial centerline. The mounting boss projects radially out from the base. The mounting boss extends axially between a first side surface and a second side surface. The first support element is configured as or otherwise includes a peripheral boss. The peripheral boss projects radially out from the base, laterally out from the mounting boss and axially to the first side surface. The second support element is configured as or otherwise includes a rib. The rib projects radially out from the base, laterally out from the mounting boss and axially to the second side surface.

The structure may also include an engine pylon and/or an engine line. The engine pylon may be mechanically fastened to the mounting boss. The engine line may be coupled to the peripheral boss.

The peripheral boss may include an aperture fluidly coupled with the engine line.

The structure may also include a coupler mounting the engine line to the peripheral boss. The coupler may be attached to the peripheral boss by one or more fasteners.

The engine line may project radially into an aperture in the peripheral boss.

At least a portion of the first support element may radially taper to the base as the first support element projects laterally away from the mounting boss.

The mounting boss may have a boss width along the axial centerline. The first support element may have an element width along the axial centerline that is smaller than the boss width.

The engine case may include a side surface. The mounting boss and the first support element may extend axially to and partially form the side surface.

The mounting boss may project radially out from the base to a mounting boss outer surface. The first support element may project radially out from the base to a peripheral boss outer surface that is angularly offset from the mounting boss outer surface.

The engine case may also include a second support element. The second support element may project radially out from the base and laterally out from the mounting boss.

The first support element may be axially offset from the second support element. The first support element may also or alternatively be laterally aligned with the second support element.

The engine case may be configured with a channel. The channel may extend axially within the engine case between the first support element and the second support element. The channel may extend radially into the engine case to the base. The channel may extend laterally into the engine case to the mounting boss.

The mounting boss may extend axially between a boss first side and a boss second side. The first support element may be connected to the mounting boss at the boss first side. The second support element may be connected to the mounting boss at the boss second side.

The first support element may be laterally offset from the second support element. The first support element may also or alternatively be axially aligned with the second support element.

The mounting boss may be laterally between the first support element and the second support element.

The second support element may be configured as a rib.

The first support element may have a first axial width. The second support element may have a second axial width that is smaller than the first axial width.

The second support element may be configured as or otherwise include a second peripheral boss.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 7 is an illustration of a portion of the outer side of the engine case with still another mounting structure configuration.

DETAILED DESCRIPTION

Figure 1:
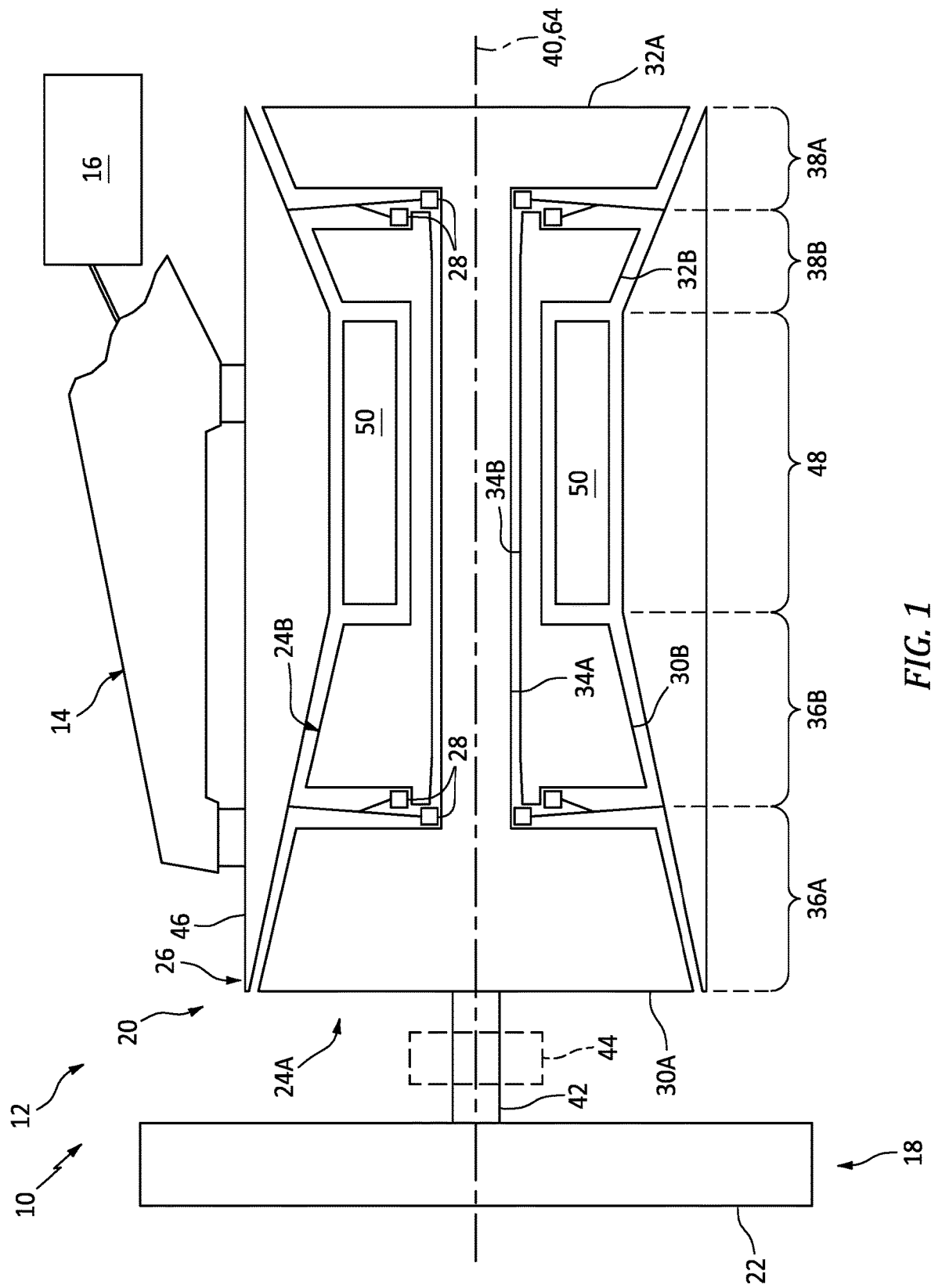
FIG. 1 is a schematic illustration of an aircraft propulsion system mounted to an aircraft component.

FIG. 1 schematically illustrates a propulsion system 10 for an aircraft. This aircraft propulsion system 10 includes a gas turbine engine 12 and an engine pylon 14 (or other structure) for mounting the gas turbine engine 12 to another component 16 of the aircraft such as, but not limited to, an aircraft wing or an aircraft fuselage.

The gas turbine engine 12 may be a turbofan gas turbine engine, a turbojet gas turbine engine, a turboprop gas turbine engine, or any other type of gas turbine engine capable of producing thrust. The gas turbine engine 12 of FIG. 1, for example, includes a propulsor 18 and a gas turbine engine core 20 configured to drive the propulsor 18. The propulsor 18 may be configured as or otherwise include a bladed propulsor rotor 22 of the gas turbine engine 12. Examples of the propulsor rotor 22 include, but are not limited to: a fan rotor for the turbofan gas turbine engine; a compressor rotor for the turbojet gas turbine engine; and a propeller rotor for the turboprop gas turbine engine.

The engine core 20 of FIG. 1 includes one or more rotating structures 24A and 24B (generally referred to as "24") (e.g., spools) and a stationary structure 26. The engine core 20 of FIG. 1 also includes a plurality of bearings 28 rotatably supporting the rotating structures 24 and mounting the rotating structures 24 to the stationary structure 26.

The first (e.g., low speed) rotating structure 24A includes a first (e.g., low pressure (LP)) compressor rotor 30A, a first (e.g., low pressure) turbine rotor 32A and a first (e.g., low speed) shaft 34A. The first compressor rotor 30A is arranged within and part of a first (e.g., low pressure) compressor section 36A of the engine core 20. The first turbine rotor 32A is arranged within and part of a first (e.g., low pressure) turbine section 38A of the engine core 20. The first shaft 34A extends axially along a rotational axis 40 between and is connected to the first compressor rotor 30A and the first turbine rotor 32A, where the first rotating structure 24A is rotatable about the rotational axis 40.

The first rotating structure 24A may also be rotatably coupled to the propulsor 18 and its rotor 22. The propulsor rotor 22, for example, may be coupled to the first rotating structure 24A through a direct drive coupling. This direct drive coupling may be configured as or otherwise include an output shaft 42. With such a direct drive coupling, the propulsor rotor 22 and the first rotating structure 24A may rotate at a common (e.g., the same) rotational speed. Alternatively, the propulsor rotor 22 may be coupled to the first rotating structure 24A through a geartrain 44 (see dashed line); e.g., a transmission. This geartrain 44 may be configured as an epicyclic geartrain. With such a geared coupling, the propulsor rotor 22 may rotate at a different (e.g., slower) rotational speed than the first rotating structure 24A.

The second (e.g., high speed) rotating structure 24B includes a second (e.g., high pressure (HP)) compressor rotor 30B, a second (e.g., high pressure) turbine rotor 32B and a second (e.g., high speed) shaft 34B. The second compressor rotor 30B is arranged within and part of a second (e.g., high pressure) compressor section 36B of the engine core 20. The second turbine rotor 32B is arranged within and part of a second (e.g., high pressure) turbine section 38B of the engine core 20. The second shaft 34B extends axially along the rotational axis 40 between and is connected to the second compressor rotor 30B and the second turbine rotor 32B, where the second rotating structure 24B is rotatable about the rotational axis 40. The second rotating structure 24B of FIG. 1 and its second shaft 34B axially overlap and circumscribe the first shaft 34A; however, the engine core 20 of the present disclosure is not limited to such an exemplary arrangement.

The stationary structure 26 includes an engine case 46; e.g., a core case. This engine case 46 is configured to at least partially or completely house the first compressor section 36A, the second compressor section 36B, a combustor section 48 of the engine core 20, the second turbine section 38B and the first turbine section 38A, where the engine sections 36A, 36B, 48, 38B and 38A may be arranged sequentially along the rotational axis 40 between an airflow inlet to the gas turbine engine 12 and an exhaust from the gas turbine engine 12. The engine case 46 of FIG. 1 axially overlaps and extends circumferentially about (e.g., completely around) the first rotating structure 24A and the second rotating structure 24B. The engine case 46 may include a plurality of discrete axial and/or circumferential sections (e.g., tubular and/or arcuate subcases), which discrete case sections are attached together to form the engine case 46.

During operation, air enters the gas turbine engine 12 through the airflow inlet. This air is directed into at least a core flowpath which extends sequentially through the engine sections 36A, 36B, 48, 38B and 38A (e.g., the engine core 20) to the exhaust. The air within this core flowpath may be referred to as "core air".

The core air is compressed by the first compressor rotor 30A and the second compressor rotor 30B and directed into a combustion chamber 50 of a combustor in the combustor section 48. Fuel is injected into the combustion chamber 50 and mixed with the compressed core air to provide a fuel-air mixture. This fuel-air mixture is ignited and combustion products thereof flow through and sequentially cause the second turbine rotor 32B and the first turbine rotor 32A to rotate. The rotation of the second turbine rotor 32B and the first turbine rotor 32A respectively drive rotation of the second compressor rotor 30B and the first compressor rotor 30A and, thus, compression of the air received from the airflow inlet. The rotation of the first turbine rotor 32A of FIG. 1 also drives rotation of the propulsor rotor 22. The propulsor rotor 22 may propel air through or outside of the gas turbine engine 12 to provide, for example, a majority of aircraft propulsion system thrust.

Figure 2:
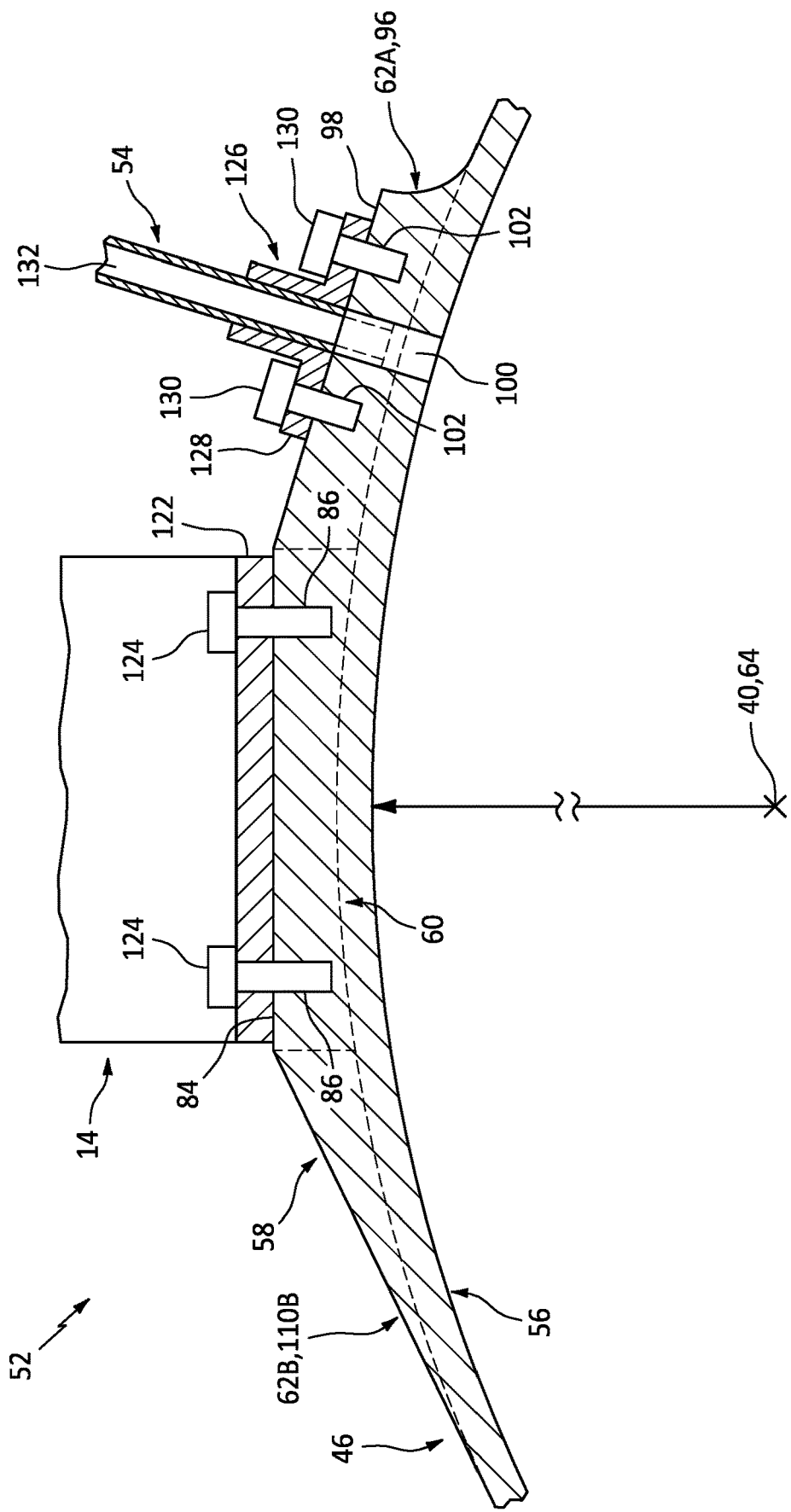
FIG. 2 is a cross-sectional illustration of a portion of the aircraft propulsion system through a mounting structure.

FIG. 2 illustrates a structure 52 for the gas turbine engine 12 of FIG. 1. This structure 52 includes the engine case 46, the engine pylon 14 and an engine line 54. The engine case 46 includes an engine case base 56 and an engine case mounting structure 58, which mounting structure 58 includes a pylon mounting boss 60 and one or more mounting boss support elements 62A-D (generally referred to as "62"); see also FIGS. 3-5.

Figure 3:
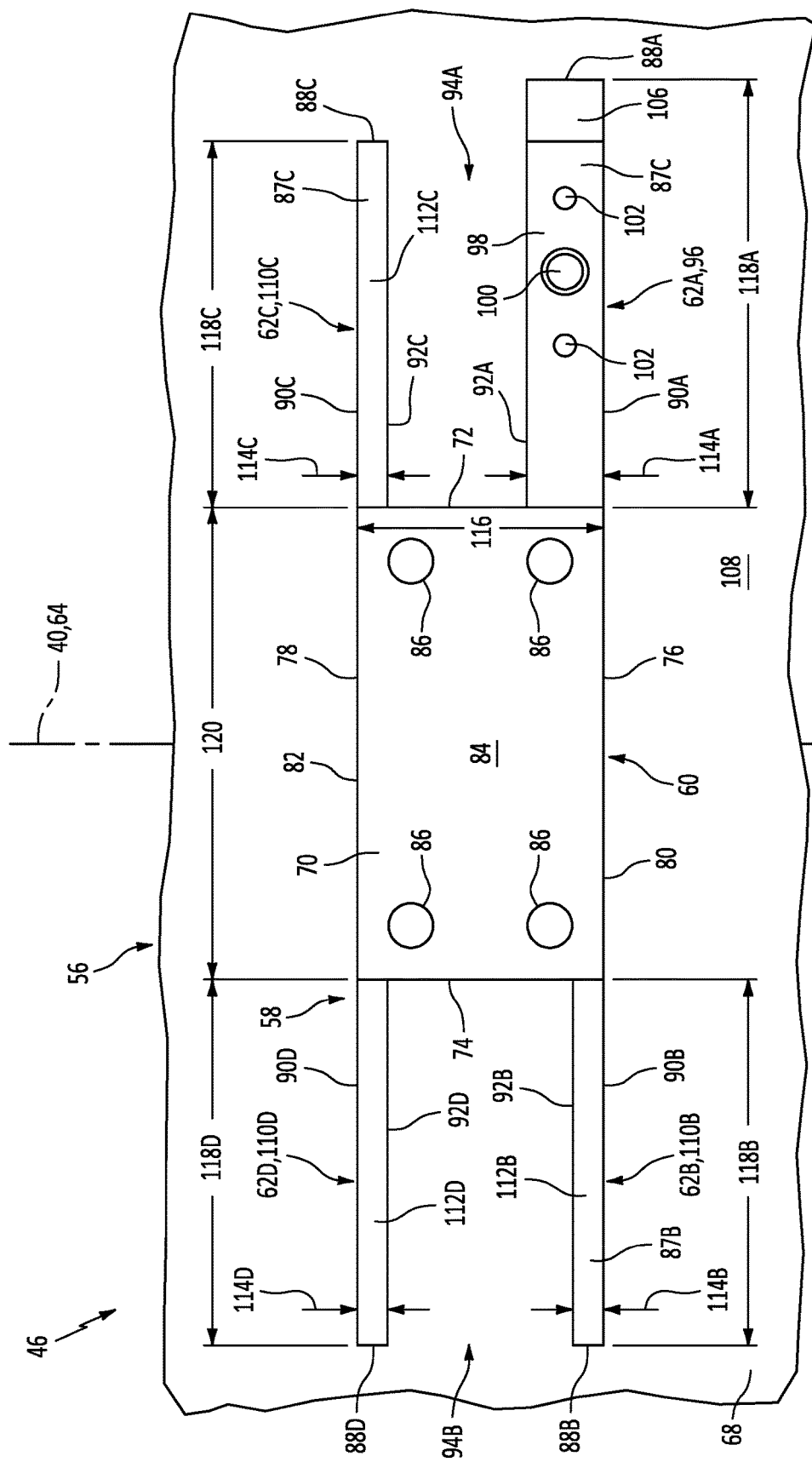
FIG. 3 is an illustration of a portion of an outer side of an engine case at the mounting structure.
Figure 4:
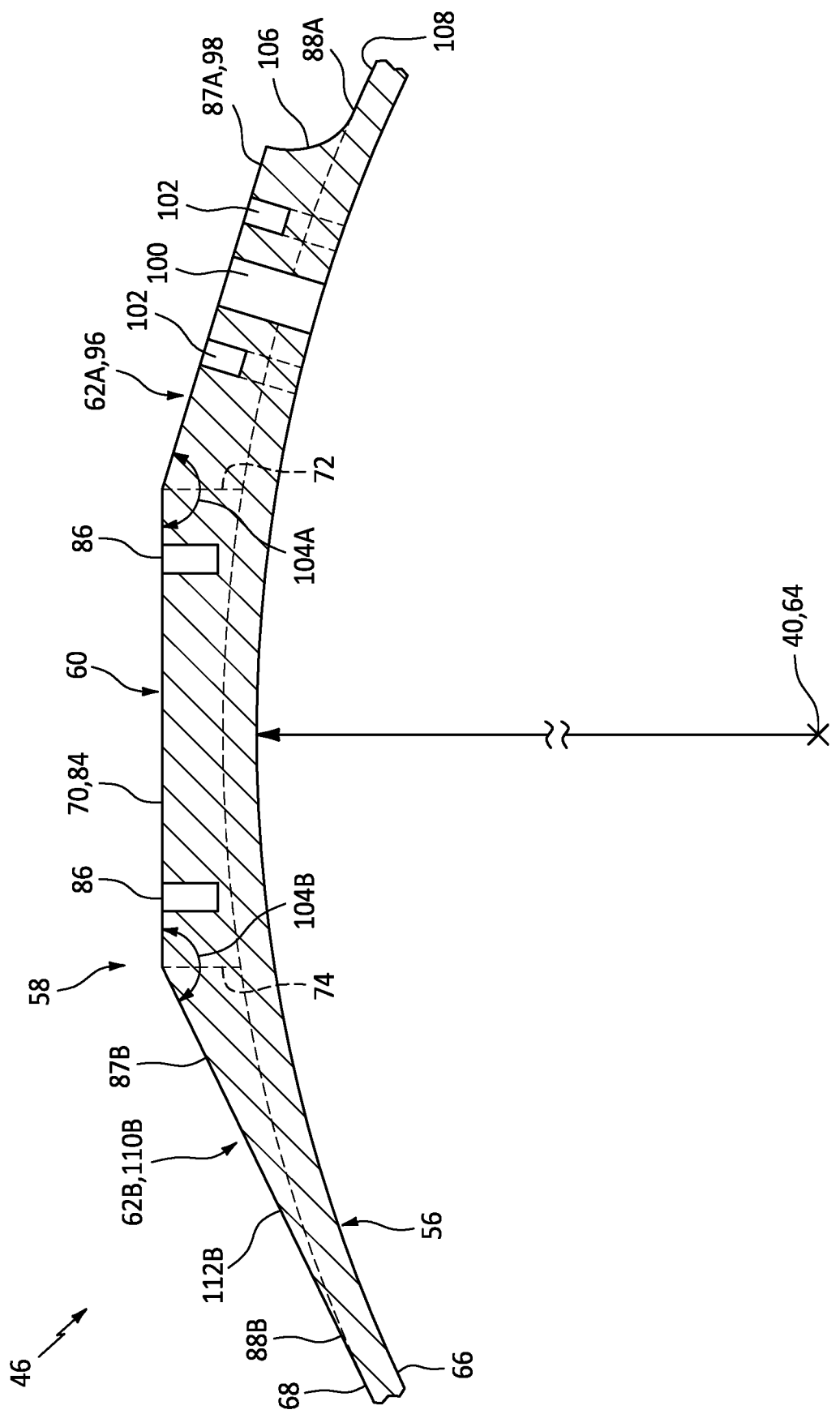
FIG. 4 is a cross-sectional illustration of a portion of the engine case at a first axial position along an axial centerline through the mounting structure.
Figure 5:
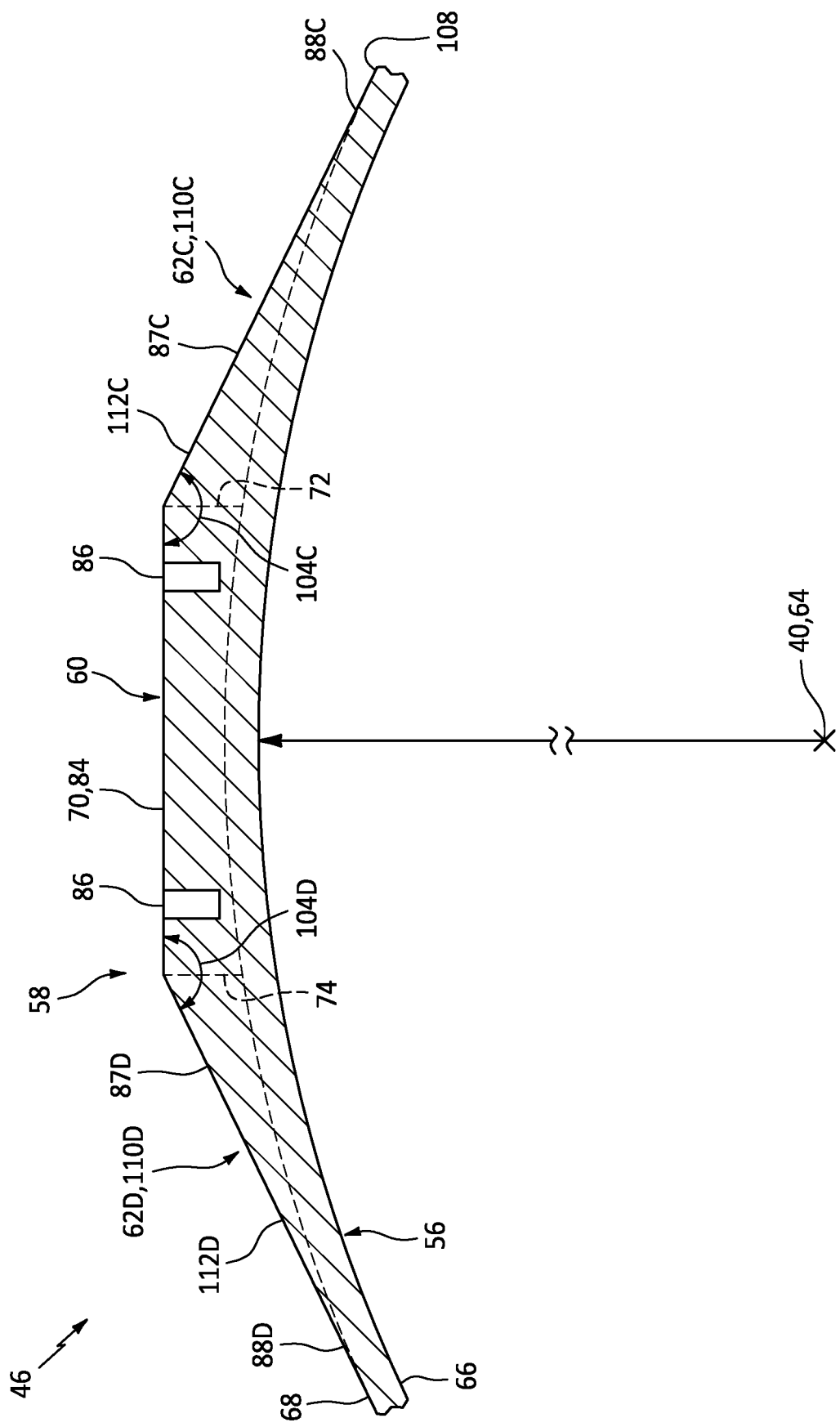
FIG. 5 is a cross-sectional illustration of a portion of the engine case at a second axial position along the axial centerline through the mounting structure.

Referring to FIG. 3, the base 56 extends axially along an axial centerline 64 of the engine case 46 and/or the gas turbine engine 12, which axial centerline 64 may be coaxial with the rotational axis 40. Referring to FIGS. 4 and 5, the base 56 extends radially between and to an inner side 66 of the base 56 and an outer side 68 of the base 56. The base 56 extends circumferentially about the axial centerline 64. The base 56, for example, may extend completely around the axial centerline 64, thereby providing the base 56 and a respective section of the engine case 46 with a tubular body. The base 56 may alternatively extend partially (e.g., halfway) around the axial centerline 64, thereby providing the base 56 and a respective section of the engine case 46 with an arcuate (e.g., half shell) body.

The mounting boss 60 is connected to the base 56 at (e.g., on, adjacent or proximate) the base outer side 68. The mounting boss 60 of FIGS. 4 and 5, for example, projects radially out from the base 56 to a distal radial outer side 70 of the mounting boss 60. Referring to FIG. 3, the mounting boss 60 extends laterally (e.g., circumferentially about the axial centerline 64, tangentially to the base outer side 68, etc.) between and to a lateral (e.g., circumferential) first side 72 of the mounting boss 60 and a lateral (e.g., circumferential) second side 74 of the mounting boss 60. The mounting boss 60 extends axially along the axial centerline 64 between and to an axial first side 76 of the mounting boss 60 and an axial second side 78 of the mounting boss 60. The mounting boss 60 may form at least a lateral intermediate portion of a first side surface 80 of the mounting structure 58 at the mounting boss axial first side 76. The mounting boss 60 may form at least a lateral intermediate portion of a second side surface 82 of the mounting structure 58 at the mounting boss axial second side 78. One or each of these mounting structure side surfaces 80 and 82 may each be configured as a flat, planar surface.

The mounting boss 60 includes a radial outer surface 84 (e.g., a pylon land) and one or more mounting apertures 86; e.g., threaded bolt holes. The mounting boss outer surface 84 is disposed at the mounting boss outer side 70. This mounting boss outer surface 84 may be configured as a flat, planar surface; see also FIGS. 4 and 5. The mounting boss outer surface 84 may extend axially between the mounting structure first side surface 80 and the mounting structure second side surface 82. The mounting boss outer surface 84 of FIG. 3, for example, is contiguous with each mounting structure side surface 80, 82. The mounting boss outer surface 84 may meet each mounting structure side surface 80, 82 at a (e.g., ~90°) respective sharp corner, or alternatively at a rounded and/or otherwise eased corner.

Referring to FIGS. 4 and 5, each mounting aperture 86 projects radially into the mounting boss 60 from the mounting boss outer surface 84. Each mounting aperture 86 may extend partially into the engine case 46; e.g., each mounting aperture 86 may be a blind (e.g., dead end) aperture. One or more or all of the mounting apertures 86 may alternatively extend radially through the engine case 46; e.g., each mounting aperture 86 may be a through-hole. Each of the mounting apertures 86 of FIG. 3 is arranged at a respective corner of the mounting boss outer surface 84; however, the present disclosure is not limited to such an exemplary arrangement/aperture pattern.

The support elements 62 are configured to structurally reinforce the connection between the mounting boss 60 and the base 56. Each support element 62, for example, provides a material extension spanning between the mounting boss 60 and the base 56. For example, each support element 62 may functionally be configured as a support leg and/or a gusset. The support elements 62 may thereby disperse loads across a larger swath of area along the base 56 than the mounting boss 60 alone. The support elements 62 may also reduce a load concentration and/or stress concentration at an interface (e.g., joint) between the mounting boss 60 and the base 56.

With such an arrangement, the support elements 62 may functionally increase the size of the mounting boss 60 without requiring additional material; e.g., if the mounting boss 60 was alternatively resized to be the same overall axial and lateral size of the entire mounting structure 58.

Each of the support elements 62 is connected to the base 56 at the base outer side 68. Each support element 62 of FIGS. 4 and 5, for example, projects radially out from the base 56 to a distal radial outer side 87A-D (generally referred to as "87") of the respective support element 62A-D. Each support element 62 is also connected to the mounting boss 60 at a respective one of the mounting boss lateral sides 72, 74. Each support element 62 of FIGS. 3-5, for example, projects laterally (e.g., circumferentially about the axial centerline 64, tangentially to the base outer side 68, etc.) out from the mounting boss 60 to a lateral (e.g., circumferential) distal end 88A-D (generally referred to as "88") of the respective support element 62. Each support element 62 of FIG. 3 extends axially along the axial centerline 64 between and to an axial exterior side 90A-D (generally referred to as "90") of the respective support element 62 and an axial interior side 92A-D (generally referred to as "92") of the respective support element 62.

The exterior sides 90A and 90B of the support elements 62A and 62B of FIG. 3 respectively form opposing side portions of the mounting structure first side surface 80. The exterior sides 90C and 90D of the support elements 62C and 62D of FIG. 3 respectively form opposing side portions of the mounting structure second side surface 82. Of course, in other embodiments, one or more or all of the exterior sides 90A and/or 90B, 90C and/or 90D may each be axially offset (e.g., spaced from) from the respective mounting boss axial side 76, 78.

The mounting boss 60 is disposed laterally between the first side support elements 62A and 62C and the second side support elements 62B and 62D. The first side support elements 62A and 62C are thereby laterally offset and spaced from the second side support elements 62B and 62D. The support elements 62A and 62B at the mounting boss axial first side 76 may be axially aligned; e.g., axially overlap. The support elements 62C and 62D at the mounting boss axial second side 78 may be axially aligned; e.g., axially overlap. However, the first side support elements 62A and 62C of FIG. 3 are axially offset and spaced from one another. The first side support elements 62A and 62C of FIG. 3, for example, are axially separated by a first side channel 94A in the engine case 46 and its mounting structure 58. The second side support elements 62B and 62D of FIG. 3 are similarly axially offset and spaced from one another. The second side support elements 62B and 62D of FIG. 3, for example, are axially separated by a second side channel 94B in the engine case 46 and its mounting structure 58. With the foregoing arrangement, each boss support element 62A-D may be arranged at a respective corner of the mounting boss 60 and its outer surface 84; however, the present disclosure is not limited to such an exemplary arrangement/aperture pattern.

The first side channel 94A extends axially within the engine case 46 and, more particularly, the mounting structure 58 between and to the interior sides 92A and 92C of the first side support elements 62A and 62C. The first side channel 94A extends laterally into the engine case 46 and, more particularly, the mounting structure 58 from the support element distal ends 88A and 88C to the mounting boss 60 at its lateral first side 72. The first side channel 94A extends radially inward into the engine case 46 and through the mounting structure 58 from the outer sides 70, 87A and 87C to the base 56 at its outer side 68.

The second side channel 94B extends axially within the engine case 46 and, more particularly, the mounting structure 58 between and to the interior sides 92B and 92D of the second side support elements 62B and 62D. The second side channel 94B extends laterally into the engine case 46 and, more particularly, the mounting structure 58 from the support element distal ends 88B and 88D to the mounting boss 60 at its lateral second side 74. The second side channel 94B extends radially inward into the engine case 46 and through the mounting structure 58 from the outer sides 70, 87B and 87D to the base 56 at its outer side 68.

At least one of the support elements (e.g., 62A) may be configured as or otherwise include a peripheral boss 96; e.g., a mounting boss for the engine line 54 of FIG. 2. The support element 62A of FIG. 4, for example, includes a peripheral boss outer surface 98 (e.g., an engine line coupler land) and an engine line aperture 100. This support element 62A may also include one or more mounting apertures 102; e.g., threaded bolt holes.

The peripheral boss outer surface 98 is disposed at the outer side 87A of the support element 62A. This peripheral boss outer surface 98 may be configured as a flat, planar surface. The peripheral boss outer surface 98 may extend laterally to the mounting boss outer surface 84. The peripheral boss outer surface 98 of FIG. 4, for example, is contiguous with the mounting boss outer surface 84. The peripheral boss outer surface 98 may meet the mounting boss outer surface 84 at a relatively sharp corner, or alternatively at a rounded and/or otherwise eased corner. The peripheral boss outer surface 98 is angularly offset from the mounting boss outer surface 84 by an included angle 104A; e.g., an obtuse angle. This included angle 104A may be greater than one-hundred and thirty-five degrees (135°) and less than one-hundred and eighty degrees (180°); e.g., between one hundred and forty degrees (140°) and one hundred and fifty-five degrees (155°), between one hundred and forty-five degrees (145°) and one hundred and fifty degrees (150°), etc. The present disclosure, however, is not limited to the foregoing exemplary positional relationship between the peripheral boss outer surface 98 and the mounting boss outer surface 84. For example, the included angle 104A may alternatively be less than one-hundred and thirty-five degrees (135°). In another example, the peripheral boss outer surface 98 and the mounting boss outer surface 84 may be parallel; e.g., coplanar.

The peripheral boss outer surface 98 of FIG. 3 may extend axially between the exterior side 90A and the interior side 92A of the support element 62A. The peripheral boss outer surface 98 of FIG. 3 is contiguous with the mounting structure first side surface 80. The peripheral boss outer surface 98 may meet the mounting structure first side surface 80 at a (e.g., ~90°) relatively sharp corner, or alternatively at a rounded and/or otherwise eased corner.

Referring to FIG. 4, the engine line aperture 100 extends radially through the engine case 46 and its elements 56, 62A and 96 from the peripheral boss outer surface 98 to the base inner side 66. This engine line aperture 100 may be configured as a receptacle, a port or a pass through for the engine line 54 (see FIG. 2) as described below in further detail.

The mounting apertures 102 projects radially into the peripheral boss 96 from the peripheral boss outer surface 98. Each mounting aperture 102 may extend partially into the engine case 46; e.g., each mounting aperture 102 may be a blind aperture. One or more or all of the mounting apertures 102 may alternatively extend radially through the engine case 46; e.g., each mounting aperture 102 may be a through-hole. The mounting apertures 102 of FIG. 3 are arranged on opposing lateral sides of the engine line aperture 100; however, the present disclosure is not limited to such an exemplary arrangement.

At least a portion of the support element 62A and its peripheral boss 96 may be tapered. For example, referring to FIGS. 3 and 4, a lateral end surface 106 of the support element 62A and its peripheral boss 96 at the lateral distal end 88A extends laterally and radially inward from the peripheral boss outer surface 98 towards (e.g., to) a radial outer surface 108 of the base 56 at the base outer side 68. An end portion of the support element 62A and its peripheral boss 96 of FIG. 4 may thereby radially taper towards (e.g., to) the base 56 as the support element 62A projects laterally away from the mounting boss 60 towards (e.g., to) the lateral distal end 88A. The lateral end surface 106 of FIG. 4 has a non-straight (e.g., curved, arcuate, splined, etc.) sectional geometry when viewed, for example, in a reference plane perpendicular to the axial centerline 64. Of course, in other embodiments, the lateral end surface 106 may have a straight sectional geometry in the reference plane.

Referring to FIG. 3, the lateral end surface 106 may extend axially between the exterior side 90A and the interior side 92A of the support element 62A and its peripheral boss 96. The lateral end surface 106 of FIG. 3 is contiguous with the mounting structure first side surface 80. The lateral end surface 106 may meet the mounting structure first side surface 80 at a (e.g., ~90°) relatively sharp corner, or alternatively at a rounded and/or otherwise eased corner. Referring to FIG. 4, the lateral end surface 106 may also or alternatively be contiguous with the peripheral boss outer surface 98. The lateral end surface 106 may meet the peripheral boss outer surface 98 at a relatively sharp corner, or alternatively at a rounded and/or otherwise eased corner.

Referring to FIGS. 3-5, one or more of the remaining boss support elements (e.g., 62B-D) may be configured as or otherwise include a reinforcement rib 110B-D (generally referred to as "110"). By contrast to the support element 62A, none of the support elements 62B-D of FIGS. 3-5 may be configured as or otherwise includes a mounting boss. One or more or all of the support elements 62B-D of FIGS. 3-5, for example, may each be configured without a fastener aperture (e.g., threaded hole), a receptacle, a port and/or any other type of aperture configured for mounting, receiving and/or otherwise coupling with another component; e.g., an engine line or an engine line coupler.

Each support element 62B-D includes a respective support element outer surface 112B-D (generally referred to as "112") at its respective outer side 87B-D. This support element outer surface 112 may extend laterally and radially inward from the mounting boss outer surface 84 towards (e.g., to) the base outer surface 108. At least an end portion or an entirety of the respective support element 62B-D of FIGS. 4 and 5 may thereby radially taper towards (e.g., to) the base 56 as the respective support element 62B-D projects laterally away from the mounting boss 60 towards (e.g., to) the lateral distal end 88B-D. Each support element outer surface 112B-D of FIGS. 4 and 5 has a straight sectional geometry when viewed, for example, in a respective reference plane perpendicular to the axial centerline 64. Of course, in other embodiments, one or more or all of the support element outer surfaces 112 may each have a non-straight (e.g., curved, arcuate, splined, etc.) sectional geometry when viewed in the respective reference plane.

Referring to FIG. 3, each support element outer surface 112B-D may extend axially between the exterior side 90B-D and the interior side 92B-D of the respective support element 62B-D. Each support element outer surface 112 of FIG. 3 is contiguous with a respective one of the mounting structure side surfaces 80, 82. Each support element outer surface 112 may meet the respective mounting structure side surface 80, 82 at a (e.g., ~90°) relatively sharp corner, or alternatively at a rounded and/or otherwise eased corner. Referring to FIGS. 4 and 5, each support element outer surface 112 may also or alternatively be contiguous with the mounting boss outer surface 84. Each support element outer surface 112 may meet the mounting boss outer surface 84 at a relatively sharp corner, or alternatively at a rounded and/or otherwise eased corner. Each support element outer surface 112 may be angularly offset from the mounting boss outer surface 84 by an included angle 104B-D; e.g., an obtuse angle. This included angle 104B-D may be greater than one-hundred and ten degrees (110°) and less than one-hundred and sixty degrees (160°); e.g., between one hundred and forty degrees (140°) and one hundred and fifty-five degrees (155°), between one hundred and forty-five degrees (145°) and one hundred and fifty degrees (150°), etc. The present disclosure, however, is not limited to the foregoing exemplary positional relationship between the support element outer surface 112 and the mounting boss outer surface 84. For example, the included angle 104B-D may alternatively be less than one-hundred and ten degrees (110°).

Referring to FIG. 3, the support element 62A and its peripheral boss 96 has an axial width 114A that extends axially between the exterior side 90A and the interior side 92A. Each of the support elements 62B-D and their reinforcement ribs 110B-D has an axial width 114B-D that extends axially between its exterior side 90B-D and its interior side 92B-D, which support element widths 114B-D may be equal or uniquely sized. Each support element width 114B-D is sized different (e.g., less) than the support element width 114A. The support element width 114A, for example, may be between one and one-half times (1.5×) and five times (5×) each support element width 114B-D; e.g., between two times (2×) and three times (3×) each support element width 114B-D. The present disclosure, however, is not limited to such an exemplary dimensional relationship. The support element width 114A, for example, may be more than five times (5×) the support elements width 114B-D. Each of the support element widths 114A-D are smaller than an axial width 116 of the mounting boss 60 between its axial sides 76 and 78.

The support element 62A and its peripheral boss 96 has a lateral length 118A that extends laterally between the mounting boss 60 and the lateral distal end 88A. Each of the support elements 62B-D and their reinforcement ribs 110B-D has a lateral length 118B-D that extends laterally between the mounting boss 60 and the lateral distal end 88B-D of the respective support elements 62B-D, which support element lengths 118B-D may be equal or uniquely sized. Each support element length 118B-D is sized equal to or less than the support element length 118A. The support element length 118A, for example, may be between one times (1×), or one and one-tenth times (1.1×), and one-half times (1.5×) each support element length 118B-D. The present disclosure, however, is not limited to such an exemplary dimensional relationship. The support element length 118A, for example, may be more than one-half times (1.5×) or less than one times (1×) the support elements length 118B-D. Each of the support element lengths 118A-D may be equal to, smaller than or greater than a lateral length 120 of the mounting boss 60 between its lateral sides 72 and 74 depending on, for example, a size of the mounting boss 60 and/or a magnitude of a load to be transferred between the mounting boss 60 and the base 56.

Referring to FIG. 2, the engine pylon 14 is mounted to the mounting boss 60. The engine pylon 14 of FIG. 2, for example, radially engages (e.g., contacts) and is abutted next to (e.g., against) the mounting boss outer surface 84. A mount 122 (e.g., flange) of the engine pylon 14 is mechanically fastened to the mounting boss 60 by one or more fasteners 124 (e.g., bolts), where each fastener 124 is mated with (e.g., threaded into) a respective one of the fastener apertures 86. With this arrangement, the mounting structure 58 and its elements 60 and 62 are configured to structurally tie the engine pylon 14 to the remainder of the engine case 46; e.g., the base 56.

The engine line 54 may be a fluid line for a sensor system, a lubrication system, a cooling system and/or a fuel system of the aircraft propulsion system 10 and its gas turbine engine 12. The engine line 54, for example, may be a fluid (e.g., gas and/or liquid) conduit such as a pipe or a hose. The engine line 54 may alternatively be an electrical line for a sensor system and/or an electrical system of the aircraft propulsion system 10 and its gas turbine engine 12. The electrical line, for example, may be a single wire or a grouping (e.g., braid) of wires. However, for ease of description, the engine line 54 may be described below as the fluid conduit.

The engine line 54 is mounted to the peripheral boss 96. The engine line 54 of FIG. 2, for example, is coupled to an engine line coupler 126; e.g., an end fitting. This engine line coupler 126 radially engages (e.g., contacts) and is abutted next to (e.g., against) the peripheral boss outer surface 98. A mount 128 (e.g., flange) of the engine line coupler 126 is mechanically fastened to the peripheral boss 96 by one or more fasteners 130 (e.g., bolts), where each fastener 130 is mated with (e.g., threaded into) a respective one of the fastener apertures 102. A bore in the engine line coupler 126 may fluidly couple an internal passage 132 of the engine line 54 with the engine line aperture 100. Alternatively, the engine line 54 may project through the engine line coupler 126 to (or into) the engine line aperture 100 such that the internal passage 132 is directly fluidly coupled with the engine line aperture 100. Still alternatively, the engine line 54 may project through the engine line coupler 126 and the engine line aperture 100 to an interior of the engine case 46.

Figure 6:
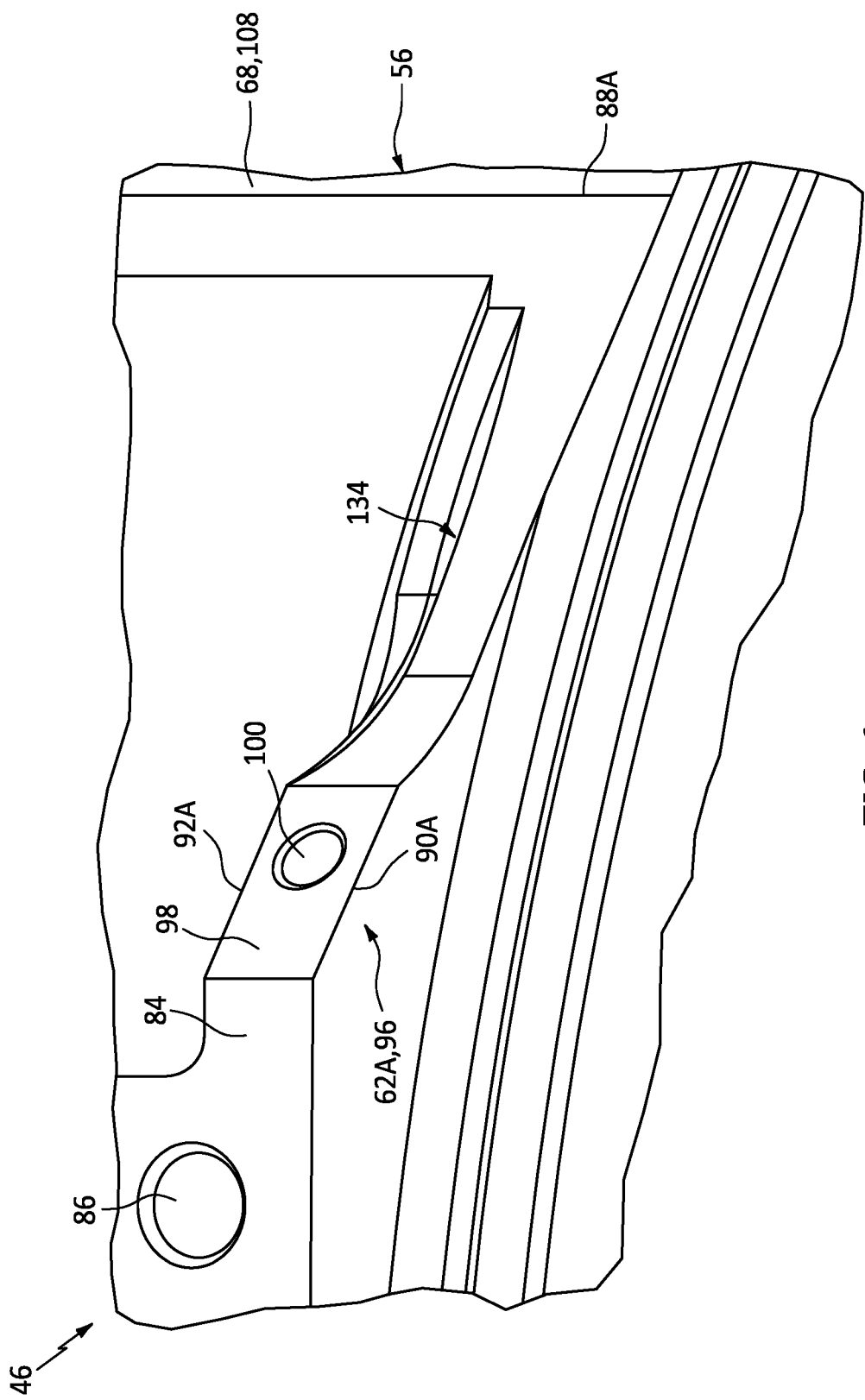
FIG. 6 is a perspective illustration of a portion of the engine case with another mounting structure configuration.

While the engine line coupler 126 is shown in FIG. 2 as fixing the engine line 54 to the peripheral boss 96, it is contemplated the engine line 54 may be fixed, attached or otherwise coupled without use of the engine line coupler 126; e.g., the engine line 54 may be bonded to or otherwise attached to the peripheral boss 96. The peripheral boss 96 of FIG. 6, for example, is configured with a single engine line aperture 100; e.g., port, receptacle, etc.

In some embodiments, referring to FIGS. 3 and 4, the support element 62A configured with the peripheral boss 96 may not be configured with a separate reinforcement rib. In other embodiments, referring to FIG. 6, the support element 62A may be configured with the peripheral boss 96 and a reinforcement rib 134, for example, projecting (e.g., laterally) out from the peripheral boss 96.

The mounting structure 58 of FIG. 3 is shown with the peripheral boss 96 at a particular corner of the mounting boss 60. It is contemplated, however, that this peripheral boss 96 may alternatively be configured any other one of the support elements 62B-D. Furthermore, while the mounting structure 58 of FIG. 3 is shown with a single peripheral boss 96, any one or more or all of the support elements 62A-D may also or alternatively be configured with its own peripheral boss 96A-D (generally referred to as "96") as shown, for example, in FIG. 7.

The mounting boss 60 is described above as mounting the engine pylon 14 to the engine case 46. However, it is contemplated the mounting boss 60 may alternatively be implemented to mount another (e.g., highly loaded) component to the engine case 46. Furthermore, the peripheral boss 96 is described above as mounting a respective engine line 54 to the engine case 46. However, it is contemplated the peripheral boss 96 may alternatively be implemented to mount another (e.g., lightly loaded, or unloaded) component to the engine case 46.

The engine case components 56, 58, 60 and 62 may be configured together as a unitary body. The base 56 and the mounting structure 58, for example, may be cast, forged, milled, machined, additive manufactured and/or otherwise formed having a monolithic body. The term "monolithic" may describe a body configured from a continuous mass of material. Examples of a monolithic body include, but are not limited to, a cast body or a body milled, machined and/or forged from a billet of material. In contrast, a non-monolithic body may be formed from a plurality of discrete bodies that are fastened together to form a single part.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A structure for a gas turbine engine, comprising:
   an engine case including a base, a mounting boss and a first support element, the base extending axially along and circumferentially about an axial centerline of the engine case, the mounting boss projecting radially out from the base, the first support element projecting radially out from the base and laterally out from the mounting boss, and the first support element comprising a peripheral boss;
   an engine pylon mounted to the mounting boss by a plurality of bolts, each of the bolts projecting radially through a mount of the engine pylon and into a respective bolt aperture in the mounting boss; and
   an engine line coupled to the peripheral boss.

2. The structure of claim 1, wherein the peripheral boss comprises an aperture fluidly coupled with the engine line.

3. The structure of claim 1, further comprising:
   a coupler mounting the engine line to the peripheral boss;
   the coupler attached to the peripheral boss by one or more fasteners.

4. The structure of claim 1, wherein the engine line projects radially into an aperture in the peripheral boss.

5. The structure of claim 1, wherein at least a portion of the first support element radially tapers to the base as the first support element projects laterally away from the mounting boss.

6. The structure of claim 1, wherein
   the mounting boss has a boss width along the axial centerline; and
   the first support element has an element width along the axial centerline that is smaller than the boss width.

7. The structure of claim 1, wherein
   the engine case comprises a side surface; and
   the mounting boss and the first support element extend axially to and partially form the side surface.

8. The structure of claim 1, wherein
   the mounting boss projects radially out from the base to a mounting boss outer surface; and
   the first support element projects radially out from the base to a peripheral boss outer surface that is angularly offset from the mounting boss outer surface.

9. The structure of claim 1, wherein
   the engine case further includes a second support element; and
   the second support element projects radially out from the base and laterally out from the mounting boss.

10. The structure of claim 9, wherein at least one of
    the first support element is axially offset from the second support element; or
    the first support element is laterally aligned with the second support element.

11. The structure of claim 9, wherein
    the engine case is configured with a channel;
    the channel extends axially within the engine case between the first support element and the second support element;
    the channel extends radially into the engine case to the base; and
    the channel extends laterally into the engine case to the mounting boss.

12. The structure of claim 9, wherein
    the mounting boss extends axially between a boss first side and a boss second side;
    the first support element is connected to the mounting boss at the boss first side; and
    the second support element is connected to the mounting boss at the boss second side.

13. The structure of claim 9, wherein at least one of
    the first support element is laterally offset from the second support element; or
    the first support element axially aligned with the second support element.

14. The structure of claim 9, wherein the mounting boss is laterally between the first support element and the second support element.

15. The structure of claim 9, wherein the second support element is configured as a rib.

16. The structure of claim 9, wherein
    the first support element has a first axial width; and
    the second support element has a second axial width that is smaller than the first axial width.

17. The structure of claim 9, wherein the second support element comprises a second peripheral boss.

18. A structure for a gas turbine engine, comprising:
    an engine case including a base, a mounting boss and a peripheral boss formed integral with the mounting boss and the base;
    the base extending axially along and circumferentially about an axial centerline of the engine case;
    the mounting boss projecting radially out from the base to a mounting boss outer surface, wherein the mounting boss outer surface is a flat, planar surface; and
    the peripheral boss projecting radially out from the base to a peripheral boss outer surface, and the peripheral boss outer surface angularly offset from and contiguous with the mounting boss outer surface, wherein the peripheral boss outer surface is a flat, planar surface.

19. The structure of claim 18, further comprising at least one of:

an engine pylon mechanically fastened to the mounting boss; or an engine line coupled to the peripheral boss.

20. A structure for a gas turbine engine, comprising:

an engine case including a base, a mounting boss, a first support element and a second support element axially spaced from the first support element by a gap;

the base extending axially along and circumferentially about an axial centerline;

the mounting boss projecting radially out from the base, the mounting boss extending axially between a first side surface and a second side surface, and the mounting boss extending laterally to a lateral side surface;

the first support element comprising a peripheral boss, the peripheral boss projecting radially out from the base, laterally out from the mounting boss and axially to the first side surface; and the second support element comprising a rib, the rib projecting radially out from the base, laterally out from the mounting boss and axially to the second side surface;

wherein the lateral side surface projects radially out from the base, and wherein the lateral side surface extends axially from the first support element to the second support element.

* * * * *